Patented Dec. 20, 1949

2,491,646

UNITED STATES PATENT OFFICE 2,491,646

PROCESS FOR TREATING ANIMAL MATERIALS

Harold M. Coleman and Albert H. Steffen, Chicago, and Ervin W. Hopkins, Hinsdale, Ill., assignors to Armour and Company, Chicago, Ill., a corporation of Illinois No Drawing. Application July 4, 1945, Serial No. 603,260

5 Claims. (Cl. 99—107)

This invention relates to a process for treating animal materials such as meat and blood, to obtain a more desirable color. More particularly, it deals with methods for altering the form or composition of the oxygen-bearing pigments to produce a bright red color. The invention further embraces certain new pigment compounds formed in the course of the treatment.

Meat contains a number of oxygen-bearing pigments including myoglobin, hemoglobin and cytochrome, all of which are compounds of ferro or ferriheme and protein. Myoglobin is purplish-red in color and when it takes up oxygen it becomes oxymyoglobin, which is bright red. Oxidation of oxymyoglobin produces metamyoglobin, which is greyish-brown in color. Similarly, homoglobin is purplish-red and on oxygenation becomes oxyhemoglobin which is bright red and this when oxidized to methemo-globin, is greyish-brown. The term "oxygen carrying pigment" as used herein is meant to include the compounds of ferro or ferriheme and protein which are capable of taking up or releasing oxygen and is intended to include such compounds whether they be in their oxygenized or deoxygenized forms.

The difficulties in connection with meat pigments are seen more readily in the case of ground meat. When beef is ground into hamburger, for example, the exterior of the meat is subjected to contact with the oxygen of the air, and the myoglobin of the exterior surface portion is converted to oxymyoglobin, which is bright red in color. The interior of the hamburger body assumes a purplish-red color due to the reduced state of the myoglobin therein. Even if the pigment were converted to oxymyoglobin in the grinding operation the natural enzymes and reducing compounds of the meat convert the oxymyoglobin into its reduced state, myoglobin. The resulting meat mass is unsatisfactory in that it has meat portions of different colors and is unattractive because of the purplish-red color of the interior. The same unsatisfactory result is found with unground meat in that the exterior has the bright red color contrasting with a purplish-red interior.

Another difficulty exists in the exterior surface of a meat cut where the oxymyoglobin and oxyhemoglobin further oxidize to metamyoglobin and methemoglobin respectively, thus producing an undesirable greyish-brown color.

An object of the present invention is to combine with the meat certain desirable vitamins which restore or maintain the bright red color on the surface meat cut, etc., and further maintain the color of the interior portions of the meat at a bright red. A further object is to treat meat or hemoglobin so as to restore or produce or maintain the color throughout substantially that of oxymyoglobin. Other specific objects and advantages will appear as the details of the invention are set out.

In the practice of our invention, we employ nicotinic acid, a vitamin sometimes referred to as niacin and important in the prevention of pellagra, and/or ascorbic acid, which is referred to as vitamin C and is important in the prevention of scurvy, certain dental disorders, etc. We may use the nicotinic acid, or niacin, also in the form of its water-soluble salts such as the alkali metal salts, particularly the sodium salt, or we may use it in the form of its methyl, ethyl, propyl, butyl or amyl esters. As used herein the term "nicotinic acid" is intended to include also such salts and esters of this substance.

The nicotinic acid may be mixed with or applied to the meat so as to bring it into contact with pigments such as myoglobin. The nicotinic acid then reacts with the pigments in their reduced state to form a new pigment reaction product which is bright red in color. Thus, myoglobin and hemoglobin, which are purplish-red in color, form with the nicotinic acid new pigment compounds which are bright red in color.

In addition to its properties in changing the color and appearance of the meat, the nicotinic acid is found to retain its properties as a vitamin upon reaction with the pigments, and so serves to impart nutritional value to the meat as well as to improve its color.

However, the nicotinic acid will not react with the ferri-heme pigments such as metamyoglobin and methemoglobin to form the pigment compounds of bright red color, and in order to produce a highly uniform product we prefer to treat the meat mass with a reducing agent. This operates to convert metamyoglobin on or near the surface of the meat mass to oxymyoglobin which is bright red. Likewise, any methemoglobin similarly present is converted to oxyhemoglobin which is bright red. Need for ascorbic acid beneath the surficial region of the meat does not exist since enzymic reduction of both metamyoglobin and metahemoglobin to myoglobin and hemoglobin respectively, occurs under these conditions after which the reduced pigments then react with nicotinic acid. Since meat surface discoloration is largely due to the formation of both metamyoglobin and metahemoglobin, the presence of ascorbic acid, by virtue of the described reducing action on the discoloration products, extends the time over which the meat possesses a bright red color.

Though we prefer to use ascorbic acid along with the nicotinic acid, the nicotinic acid may be used alone in treating meat and blood. The use of nicotinic acid alone shows best results when air is excluded from the meat, as in the case of a loaf which is wrapped or packaged in tightly-fitting or sealed air-impermeable envelopes. Ascorbic acid may also be used without the nicotinic acid and this process has its chief usefulness in providing a fresh red exterior color. For example, the ascorbic acid may be applied to the surface of small cuts of fresh meat or to sliced meat products, such as dried beef or meat loaves, in which it is desired to retain the desired surface color. Ascorbic acid acts as a reducing agent toward metamyoglobin in the presence of oxygen. The metamyoglobin is reduced by the ascorbic acid to myoglobin which, through presence of the oxygen of the air, is caused to assume the form of the desired oxymyoglobin; a similar effect is had in connection with methemoglobin. Consequently, ascorbic acid is particularly effective with meat products which are wrapped in unsealed transparent wrappers.

For uniform results with respect to the entire body of meat, we prefer to employ both ascorbic acid and nicotinic acid. Treatment with this combination of materials results in a product which has a uniformly bright red color throughout and which is retained during the subsequent freezing or other operations for periods of time as required by such practices.

Treatment of whole meat, such as cuts of meat or whole carcasses, may be accomplished by dusting the exposed surfaces with ascorbic acid and/or nicotinic acid, while, for carcasses, solutions containing nicotinic acid or ascorbic acid or the two treating materials combined may be injected, preferably into the arteries and veins.

The quantities of acids required will vary according to the form of the meat being treated and the effective distribution thereof throughout the meat mass. Very satisfactory results have been obtained by employing nicotinic acid in the amount of 0.3 gm. per pound of meat. Similarly, good results have been obtained with ascorbic acid in the amount of 0.05 gm. of ascorbic acid per pound of the meat mass. The same quantities of each acid may be used when the two are combined. With better means of distribution, a smaller amount of the treating material may be used. A substantial reduction in the amount results in inferior products. The amount of the vitamin-treating material can be increased in each instance without harm resulting, but without any substantial gain in the effect upon the color of the pigments. It will be understood, however, that where difficulties of distribution are presented, greater quantities of the treating materials may be required.

The time of treatment will also vary due to the different rates of diffusion possible in the form of the meat being treated. When meat is ground and rapid diffusion is possible, the treatment may be effected within a few hours, while with meat cuts and whole carcasses several days may be required for effective treatment, although with effective means of diffusion the operation here may be reduced to a matter of hours.

For the purpose of illustration, the following specific examples are set out:

*Example 1.*—Fresh beef trimmings were ground once through a plate with $\frac{1}{8}$ in. holes. To a portion of the ground beef, nicotinic and ascorbic acids were added in the amounts of 0.3 and 0.05 g. respectively per pound of meat, and mixed thoroughly. Loaves 3 x 3 x 8 in. were formed of both treated and untreated meat. The loaves were wrapped in paper, held at 40° F. for 4 hrs. to allow diffusion of the acids through the meat particles, and then frozen at $-18°$ to $-20°$ F. On the following morning, the loaves were broken open. The meat containing nicotinic acid and ascorbic acid was a bright red on both inside and outside of the piece, while the untreated meat was a darker red on the outside and a deep red-purple inside.

*Example 2.*—Pork chops were dusted with a light application of nicotinic acid, wrapped tightly in a heavy waxed paper, and retained for 3 days in a cooler at 40° F. Those pork chops treated with nicotinic acid were a much brighter red color than the untreated chops which served as controls.

*Example 3.*—A solution of nicotinic acid was injected with a syringe and hypodermic needle into several parts of a piece of dark-colored beef. When the beef was cut open 4 hrs. later, bright red areas were found about the regions where injections were made.

While in the foregoing specification, we have set forth certain details and specific steps, it will be understood that variations therein may be made by those skilled in the art without departing from the spirit of our invention. While in the foregoing description we have referred more particularly to the treatment of meat, it will be understood that the same processes and principles apply when treating other materials, such as blood, containing the oxygen carrying animal pigments, and the invention is intended to embrace the treatment of any such materials in the manner herein set forth.

We claim:

1. In a process for improving the color of animal material containing myoglobin, the step of contacting said myoglobin with nicotinic acid to produce a reaction pigment of bright red color.

2. In a process for improving the color of animal material containing hemoglobin, the step of contacting said hemoglobin with nicotinic acid to produce a reaction pigment of bright red color.

3. In a process for improving the color of comminuted meat, the step of mixing nicotinic acid with said meat to produce a meat containing myoglobin and hemoglobin product containing a reaction pigment of improved color.

4. In a process for improving the color of animal material containing myoglobin, the step of contacting said myoglobin with at least 0.3 gram of nicotinic acid per pound of said material to produce a reaction pigment of bright red color.

5. In a process for improving the color of animal material containing hemoglobin, the step of contacting said hemoglobin with at least 0.3 gram of nicotinic acid per pound of said material to produce a reaction pigment of bright red color.

HAROLD M. COLEMAN.
ALBERT H. STEFFEN.
ERVIN W. HOPKINS.

(References on following page)

REFERENCES CITED

The following references are of record in the file of this patent:

UNITED STATES PATENTS

| Number | Name | Date |
|---|---|---|
| 2,021,621 | Allen et al. | Nov. 19, 1935 |
| 2,060,422 | McKee et al. | Nov. 10, 1936 |
| 2,147,261 | Lewis | Feb. 14, 1939 |
| 2,177,519 | Doyle | Oct. 24, 1939 |

FOREIGN PATENTS

| Number | Country | Date |
|---|---|---|
| 516,513 | Great Britain | Jan. 4, 1940 |

OTHER REFERENCES

"Annular Review of Biochemistry," 1945, by Luck and Smith, vol. XIV, page 489.

"Nicotinic Acid," annotated Bibliography Supplement, 1942, by Merck & Co., pages 7, 21, 22 and 48.

"Industrial and Engineering Chemistry," vol. 33, No. 6, June 1941, pages 707–722.